US010289203B1

(12) United States Patent
Liu et al.

(10) Patent No.: US 10,289,203 B1
(45) Date of Patent: May 14, 2019

(54) DETECTION OF AN INPUT OBJECT ON OR NEAR A SURFACE

(71) Applicant: Amazon Technologies, Inc., Seattle, WA (US)

(72) Inventors: Yue Liu, Milpitas, CA (US); Ning Yao, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 226 days.

(21) Appl. No.: 13/783,854

(22) Filed: Mar. 4, 2013

(51) Int. Cl.
*G06F 3/01* (2006.01)

(52) U.S. Cl.
CPC .................................. *G06F 3/017* (2013.01)

(58) Field of Classification Search
CPC .. G06F 3/0488; G06F 3/04883; G06F 1/3203; G06F 3/041; G06F 3/0425; G06F 3/017; G06F 3/016; G06F 3/0412; G06F 3/0414
USPC ..... 345/173–175, 418–419, 660; 348/46–48; 715/702–705
See application file for complete search history.

(56) References Cited

U.S. PATENT DOCUMENTS

| 7,418,392 | B1 | 8/2008 | Mozer et al. | |
|---|---|---|---|---|
| 7,720,683 | B1 | 5/2010 | Vermeulen et al. | |
| 7,774,204 | B2 | 8/2010 | Mozer et al. | |
| 8,289,316 | B1 * | 10/2012 | Reisman et al. | 345/419 |
| 8,887,043 | B1 * | 11/2014 | Pollack et al. | 715/702 |
| 2005/0226505 | A1 * | 10/2005 | Wilson | G06F 3/0425 |
| | | | | 382/180 |
| 2009/0058829 | A1 * | 3/2009 | Kim | G06F 3/016 |
| | | | | 345/173 |
| 2009/0128498 | A1 * | 5/2009 | Hollemans et al. | 345/173 |
| 2009/0207140 | A1 * | 8/2009 | Hansson | G06F 3/04883 |
| | | | | 345/173 |
| 2009/0219255 | A1 * | 9/2009 | Woolley | G06F 3/0416 |
| | | | | 345/173 |
| 2011/0050629 | A1 * | 3/2011 | Homma | G06F 3/0414 |
| | | | | 345/174 |
| 2011/0164029 | A1 * | 7/2011 | King et al. | 345/419 |
| 2011/0279364 | A1 * | 11/2011 | Koshiyama | G06F 3/0412 |
| | | | | 345/156 |
| 2012/0056850 | A1 * | 3/2012 | Kasahara | G06F 3/0416 |
| | | | | 345/174 |

(Continued)

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

*Primary Examiner* — Jennifer Mehmood
*Assistant Examiner* — James S Nokham
(74) *Attorney, Agent, or Firm* — Lee & Hayes, P.C.

(57) ABSTRACT

A number of images of an environment may be obtained over time by a number of sensors. The images may include an input surface and an input object, such as a hand or stylus, that may be utilized by a user to provide an input via the input surface. In some cases, the input may be provided without the input object touching the input surface. The location of the input object with respect to the input surface over time and a speed of the input object over time may be used to determine whether an input has been indicated by the input object without contacting the input surface.

29 Claims, 9 Drawing Sheets

(56) References Cited

U.S. PATENT DOCUMENTS

| | | | |
|---|---|---|---|
| 2012/0120015 A1* | 5/2012 | Suggs | G06F 3/017 |
| | | | 345/173 |
| 2012/0188285 A1* | 7/2012 | Friedlander | G06F 1/3203 |
| | | | 345/660 |
| 2012/0223885 A1 | 9/2012 | Perez | |
| 2012/0229377 A1* | 9/2012 | Kim | G06F 3/017 |
| | | | 345/157 |
| 2012/0231839 A1* | 9/2012 | Seo et al. | 455/556.1 |
| 2012/0242793 A1* | 9/2012 | Im et al. | 348/46 |
| 2012/0249422 A1* | 10/2012 | Tse et al. | 345/158 |
| 2012/0326995 A1* | 12/2012 | Zhang | G06F 3/0425 |
| | | | 345/173 |
| 2013/0009914 A1* | 1/2013 | Kano et al. | 345/175 |
| 2013/0154985 A1* | 6/2013 | Miyazaki | G06F 3/0418 |
| | | | 345/173 |

\* cited by examiner

US 10,289,203 B1

DETECTION OF AN INPUT OBJECT ON OR NEAR A SURFACE

BACKGROUND

User interfaces have traditionally relied on input devices such as keyboards, which require physical manipulation by a user. For instance, traditional human-to-computer interfaces are based on some form of physical touch, such as depressing keys on a computer keyboard, moving a mouse and clicking a button, moving a joystick, tapping a touch screen, and so forth. This physical type of human-to-computer interface is reliable and precise.

Increasingly, however, it is desired to detect and monitor the physical positions and movements of users within a scene or environment. User motions and gestures can be used in some environments as user commands and inputs to automated systems. In particular, it may be desirable to provide input from a user to a computerized system without contacting a surface or using an input device coupled to the computerized system.

Accordingly, there is a need to develop and improve ways to detect input provided by a user that does not rely on touching a surface or using an input device coupled to a system.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
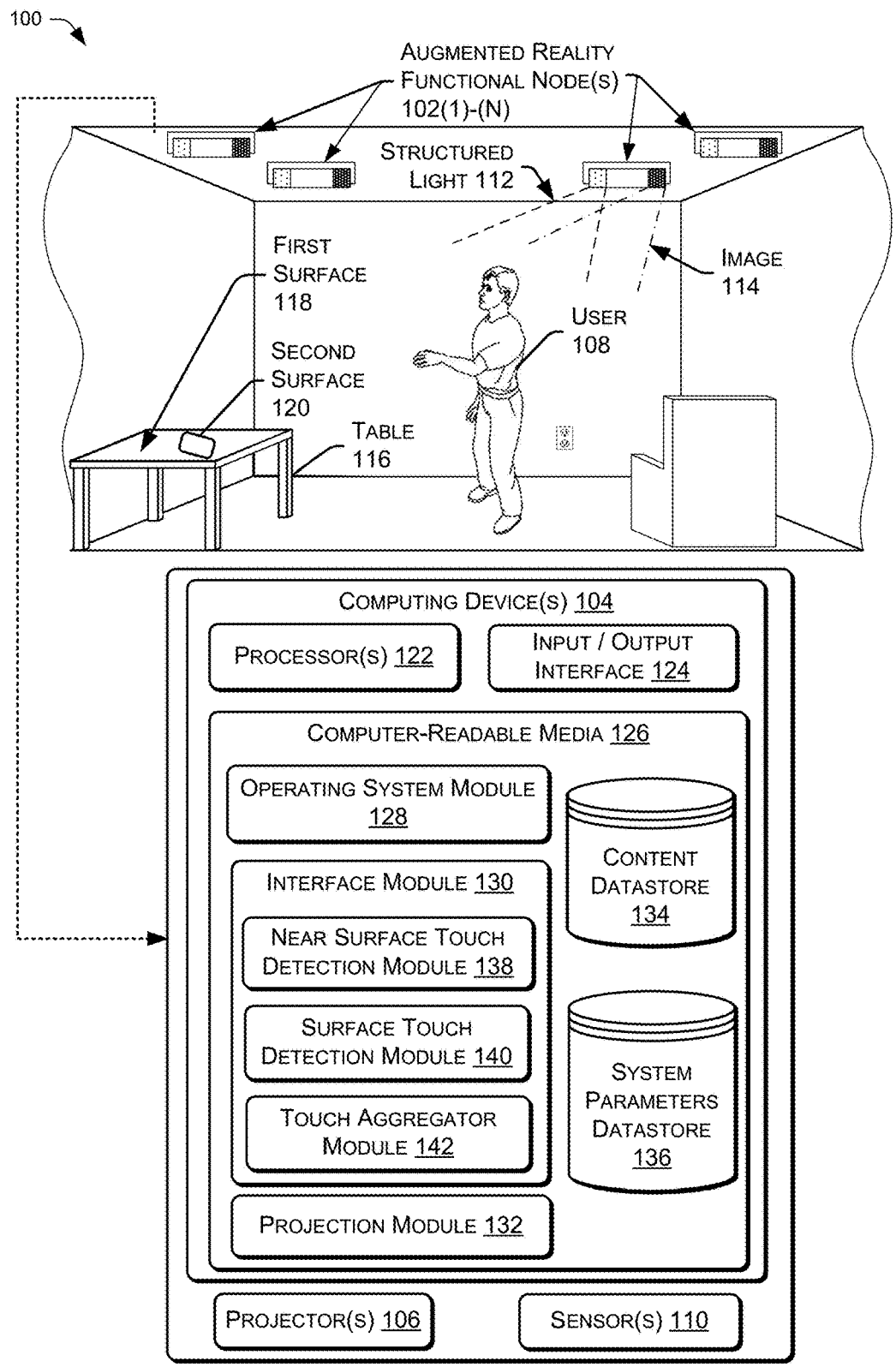
FIG. 1 illustrates an environment that includes an augmented reality functional node (ARFN) and a user that may interact with the ARFN using hand gestures.

Described herein are systems and techniques for the detection of an input on or near a surface. In some cases, users in an environment may not want to touch a surface to provide an input. For example, when the hands of a user are dirty or wet, a user may prefer to provide an input without touching an input surface that includes a user interface. Detecting an input near a surface is non-trivial, due to the complexity of determining a location of an input object, such as a hand, with respect to the input surface, determining when the user has actually provided an input, and determining a portion of the input surface indicated by the input object. The techniques described herein utilize 2-dimensional (2D) images and 3-dimensional (3D) images to determine when an input near a surface has occurred and to identify the input according to an estimated location on the input surface that is indicated by the input object.

For purposes of continuing discussion, an input surface may refer to any surface that can be used to indicate an input. In some cases, a user interface may be projected onto the input surface. In other situations, the input surface may be a display of an electronic device. In particular instances, the input surface may be touch sensitive. In some implementations, the input surface is a portion of a larger surface. Additionally, as used herein, an input object may include any object used to indicate an input. For example, an input object can include a pointing finger, a hand, a stylus, a writing instrument, a pointer, a combination thereof, and the like. Furthermore, the term touch event, as used herein, may refer to a point in time when a system determines that a user has provided an input indicating a particular location on the input surface. In some cases, a touch event may refer to an input that is near an input surface, which may be referred to herein as a "near surface" touch event. In other situations, a touch event may refer to an input that is on the input surface, which may be referred to herein as a "surface" touch event.

In one implementation, data associated with the environment is obtained over time by one or more sensors located in the environment. For example, cameras located in the environment may capture images of the environment. In some cases, the cameras may be 3D and 2D cameras to capture 2D images, 3D images, or both. The data obtained by the sensors may be used to determine a location of an input object with respect to an input surface in the environment. The data may also be used to analyze the motion of the input object with respect to the input surface.

In a particular implementation, a range of distances extending away from the input surface may include a threshold region. When the input object is within the threshold region, a system may determine whether an input is being indicated by the input object. In some cases, the system may determine whether the input object has stopped within the threshold region. In instances when the input object has stopped within the environment, the system may determine that an input is being indicated by the input object. In an illustrative implementation, the system may determine that the input object has stopped based on a distance that the input object travels toward the input surface from one image to one or more subsequent images. For example, when the distance that an input object travels from one image to the next is less than a specified distance, then the system may determine that the input device has stopped and that a touch event has occurred. In another illustrative implementation, the system may determine that an input is being indicated by the input object when the input object changes direction. To illustrate, the system may determine that instead of travelling toward the input surface, the input object has changed direction and is travelling away from the input surface. In these cases, the system may determine that a touch event has occurred based on the change in direction of the input object.

After determining that a touch event has occurred, the system may estimate a location on the input surface that the input object is indicating. For example, when a user interface having a number of input features, such as a number of buttons or icons, is provided on the input surface, the system may determine which button is being indicated by the input object. In some situations, the input object may cast a shadow onto the input surface. In these situations, the shadow cast onto the input surface may approximate a location that the input object is indicating, such as a particular button of the plurality of buttons shown on the input surface. In additional scenarios, the location of the input surface being indicated by the input object may be determined by extrapolating a location of the input object near the input surface to a location on the input surface. For instance, the location of the input object may be extrapolated based on a trajectory of motion of the input object, a projection axis along which a projector is projecting light into the environment, a direction that the hand of the user is facing, a direction that a body of the user is facing, or a combination thereof. Once the location on the input surface being indicated by the input object is determined, the system can generate a response corresponding to the input being selected.

FIG. 1 shows an illustrative augmented reality environment 100 in which the described techniques may be performed. The environment 100 includes one or more augmented reality functional nodes (ARFNs) 102(1), . . . , 102(N) (collectively referred to as "the ARFN 102" in some instances). While the environment 100 illustrates four nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices having projection and imaging capabilities.

As illustrated, each ARFN 102 may include one or more computing devices 104, as well as one or more projectors 106 that, when active, project content onto any surface within the environment 100. The projected content may include electronic books, videos, images, interactive menus, maps, recipes, web content, or any other sort of visual content.

For instance, a user 108 within the environment 100 may request that the ARFN 102 project a particular electronic book that the user 108 wishes to read. In response, the ARFN 102 may project the book onto a projection surface within the environment 100. In another example, the user 108 may request that the ARFN 102 project a particular movie or show that the user 108 wishes to watch. In response, the ARFN 102 may obtain the content (locally or remotely) and may project the content onto a surface in the environment 100. In yet another example, the ARFN 102 may be configured to project a user interface (UI), such as a keyboard, a slider bar, a virtual remote control to operate a television within the environment 100, a telephone keypad, or any other type of UI. In some cases, the ARFN 102 may project the UI onto a display object in the environment 100, such as a hand of the user 108. As still another example, the user 108 may be in a kitchen preparing a meal, and the ARFN 102 projects a recipe onto a surface, such as a countertop, wall, or refrigerator door. The user can navigate through the recipe through a series of gestures or intended touch inputs. The near surface touch detection described herein is particularly useful in this scenario as the user's hands may be wet or messy due to food preparation, and yet the user can still effectuate input without physical contact of the projected UI.

As discussed in further detail below, the ARFN 102 may include one or more sensor(s) 110 that may obtain data from the environment 100. In some implementations, the sensors 110 may include cameras (e.g., motion and/or still cameras), audio sensors (e.g., microphones), ultrasound transducers, heat sensors, motion detectors (e.g., infrared imaging devices), depth sensing cameras, weight sensors, touch sensors, tactile output devices, olfactory sensors, temperature sensors, humidity sensors, pressure sensors, or combinations thereof. In a particular implementation, the sensors 110 may include cameras that capture images of the illustrated user 108 providing input to the ARFN 102, such as by operating a projected UI, and in response, the ARFN 102 may provide feedback to the user 108 and/or may cause performance of actions corresponding to the selection by the user 108. For instance, when the ARFN 102 projects a remote control, the ARFN 102 may provide feedback to the user 108 indicating which button(s) a user is in position to select, may identify a particular selection of the user 108 (e.g., a selection to power on the television) and, in response, may operate the television according to the identified selection. The cameras 110 may be 2D and/or 3D cameras to image the scene and capture images that show the user interacting with the projected UI. While a few examples have been given, it is to be appreciated that the ARFN 102 may project any other sort of content within the environment 100, including audio, video, or other content that can be perceived by user senses (e.g., aromatic content). In addition, the ARFN 102 may recognize and interpret gestures that are made by the user 108 without reference to a UI projected within the environment 100.

In the illustrative example of FIG. 1, one of the ARFNs 102 within the environment 100 is shown to project structured light 112. In addition, the ARFN 102 may capture one or more images 114 within the environment 100 for the purpose of identifying distortions in the structured light 112. While FIG. 1 illustrates one ARFN 102 projecting this structured light 112 and imaging the environment 100 to identify the distortions, in some implementations, one or more other ARFNs 102 may additionally or alternatively perform these functions. In either instance, by imaging the environment 100 in this manner, the ARFNs 102 may identify gestures of the user 108 within the environment 100. Such gestures may be interpreted as instructions or commands to be implemented by the ARFNs 102.

Note that certain embodiments may not involve the projection of structured light. Accordingly, it should be understood that use of structured light is but one example of various techniques that may be used in object recognition of objects in a scene. For instance, the ARFN 102 may utilize time-of-flight (ToF) sensors or any other type of depth-sensing techniques to aid in identifying objects within the environment 100.

In the illustrative implementation of FIG. 1, the environment 100 includes a table 116 having a first surface 118. The environment 100 also includes a second surface 120. In one example, the second surface 120 may be a surface of an electronic device, such as a display screen of a computing device or a television screen. In another example, the second surface 120 may be a surface of a non-electronic object, such as a board, a pad of paper, a sheet of plastic, etc. In some cases, the first surface 118, the second surface 120, or both may act as input surfaces by which touch events provided by the user 108 to indicate particular input features on the input surface may be detected.

As illustrated, the computing device 104 of the example ARFN 102 includes one or more processors 122, an input/ output interface 124, and memory or computer-readable media 126. The processors 122 may be configured to execute instructions, which may be stored in the computer-readable media 124 or in other computer-readable media accessible to the processors 122.

Figure 2:
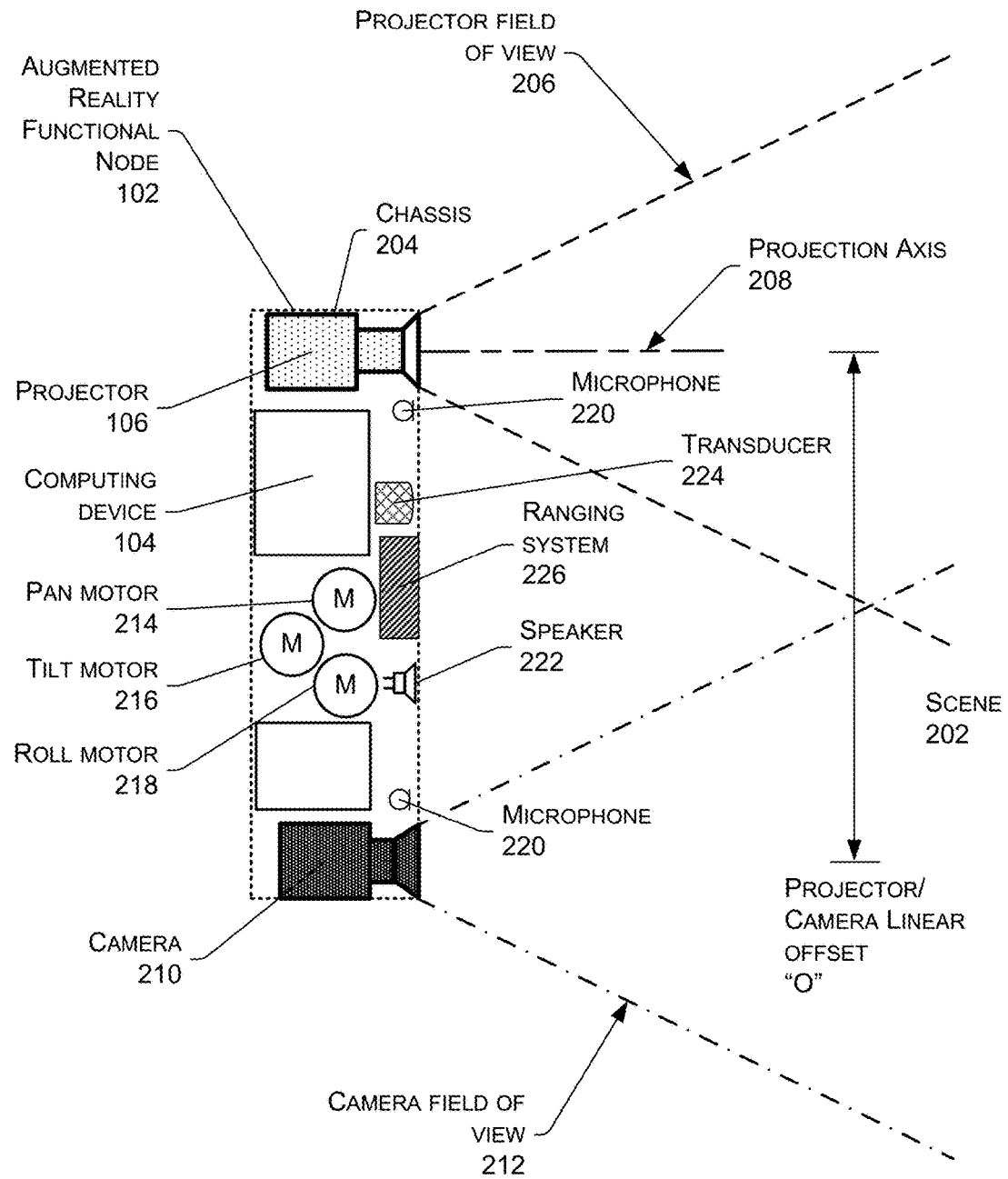
FIG. 2 illustrates an example ARFN that includes a computing device, a projector, a camera, and other selected components for allowing a user to interact with the ARFN with the use of gestures interpreted by the ARFN.

The input/output interface 124, meanwhile, may be configured to couple the computing device 104 to other components of the ARFN 102, such as the projector 106, the sensor 110, microphones, other ARFNs 102, other computing devices, and so forth. The coupling between the computing device 104 and the devices may be via wire, fiber optic cable, wireless connection, or the like. Furthermore, while FIG. 1 illustrates the computing device 104 as residing within a housing of the ARFN 102, some or all of the components of the computing device 104 may reside at another location that is operatively connected to the ARFN 102. In still other instances, certain components, logic, and/or the like of the computing device 104 may reside within the projector 106, the sensor 110, or both. Therefore, it is to be appreciated that the illustration of the ARFN 102 of both FIGS. 1 and 2 is for illustrative purposes only, and that components of the ARFN 102 may be configured in any other combination and at any other location.

The computer-readable media 126, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the computing device 104. The computer-readable media 126 may reside within a housing of the ARFN 102, on one or more storage devices accessible on a local network, on cloud storage accessible via a wide area network, or in any other accessible location.

The computer-readable media 126 may store several modules, such as instructions, datastores, and so forth that are configured to execute on the processors 122. For instance, the computer-readable media 126 may store an operating system module 128, an interface module 130, a projection module 132, a content datastore 134, and a system parameters datastore 136.

The operating system module 128 may be configured to manage hardware and services within and coupled to the computing device 104 for the benefit of other modules. The interface module 130, meanwhile, may be configured to receive and interpret commands received from users within the environment 100. For instance, the interface module 130 may analyze and parse images captured by the sensor 110 to identify one or more hands in the environment 100. In response to recognizing a hand and identifying a gesture formed by the hand, the interface module 130 may interpret the gesture and cause the ARFN 102 to perform a corresponding action. For instance, if the user 108 within the environment 100 makes a gesture requesting that the ARFN 102 project a certain piece of content, the interface module 130 may interpret the gesture and cause the projection module 132 to project the content via the projector 106.

The interface module 130 may include a near surface touch detection module 138 and a surface touch detection module 140. The near surface touch detection module 138 may be configured to determine whether the user 108 is providing an input via the first surface 118 or the second surface 120 without touching the first surface 118 or the second surface 120. In addition, the surface touch detection module 140 may be configured to determine whether the user 108 has indicated an input by touching an input surface, such as the first surface 118 or the second surface 120. In an implementation, when multiple user interfaces are displayed via multiple respective input surfaces, multiple instances of the near surface touch detection module 138 and the surface touch detection module 140 may be invoked. In these situations, each instance of the near surface touch detection module 138 and each instance of the surface touch detection module 140 are associated with a particular input surface. For example, a first user interface may be displayed via the first surface 118 and a second user interface may be displayed via the second surface 120. In this example, a first instance of the near surface touch detection module 138 and a first instance of the surface touch detection module 140 may be invoked to determine whether a touch event has occurred with respect to the first surface 118, and a second instance of the near surface touch detection module 138 and a second instance of the surface touch detection module 140 may be invoked to determine whether a touch event has occurred with respect to the second surface 120.

In a particular implementation, the near surface touch detection module 138 may determine whether a distance between a location of an input object utilized by the user 108 (e.g., finger, stylus) and a location of an input surface (e.g., the first surface 118 or the second surface 120) is within a threshold region extending above the input surface. While the input object is within the threshold region, the near surface touch detection module 138 may analyze the motion of the input object to determine whether a touch event has occurred. For example, the near surface touch detection module 138 may determine whether the input object has temporarily stopped while moving toward the input surface. In another example, the near surface touch detection module 138 may determine whether the input object changes direction from moving toward the input surface to moving away from the input surface. The near surface touch detection module 138 may then determine whether a touch event indicating an input provided by the user 108 has occurred based, at least in part, on whether the input object has stopped while in the threshold region, whether the input object has changed direction while in the threshold region, or both. In some cases, the touch event may include a gesture, such as a dragging gesture or sliding gesture, where the input object moves parallel to the input surface after coming to a stop or nearly coming to a stop at a location above the input surface and within the threshold region.

Additionally, the surface touch detection module 140 may determine whether a touch event has occurred by determining a distance between a location of the input object and a location of the input surface while the input object is within the threshold region. In particular, the surface touch detection module 140 may determine whether the distance between the input object and the input surface is less than a particular distance, such as 0.5 mm. In instances where the distance between the input object and the input surface is less than the particular distance, the surface touch detection module 140 may determine that the input object is touching the input surface and that a touch event has occurred. In another implementation, the input surface may include a touch sensitive surface and the surface touch event module 140 may determine that a touch event has occurred by receiving signals from the touch sensitive surface that the input object has touched the input surface.

After determining that a touch event has occurred, the near surface touch detection module 138 or the surface touch detection module 140 may determine a portion of the input surface that is being indicated by the input object in association with the touch event. For example, the near surface touch detection module 138 or the surface touch detection module 140 may identify a particular portion of the input surface that the user 108 is pointing to or that the user 108 has touched. In one implementation, the particular portion of the input surface being indicated by the input object may correspond to a particular input signal that is provided to the ARFN 102. In some cases, the near surface touch detection module 138 and/or the surface touch detection module 140 may estimate a location on the input surface being indicated by an input object utilized by the user 108 to produce a touch event based on a location of a shadow cast on the input surface by the input object. To illustrate, a tip of a shadow being cast by the input object on the input surface may indicate the particular portion of the input surface being indicated by the input object. In other situations, the near surface touch detection module 138 and/or the surface touch detection module 140 may estimate a portion of the input surface being indicated by the input object by extrapolating the location of the input object along an axis to the input surface.

The interface module 130 also includes a touch aggregator module 142 configured to receive input from the near surface touch detection module 138 and the surface touch detection module 140 indicating whether or not a touch event has occurred. In some situations, the near surface touch detection module 138 and the surface touch detection module 140 may each provide a separate signal that a touch event has occurred in conjunction with a single touch event. To illustrate, while using a finger to indicate an input on the second surface 120, the user 108 may pause momentarily within the threshold region before resuming movement of the finger and touching the second surface 120. In this case, the pause in the motion of the finger of the user 108 in the threshold region would trigger the detection of a touch event by the near surface touch detection module 138 and the touching of the second surface 120 by the finger of the user 108 would trigger the detection of a touch event by the surface touch detection module 140 and the near surface touch detection module 138. To prevent multiple signals indicating a single input from being returned, the touch aggregator module 142 may analyze data received from the near surface touch detection module 138 and the surface touch detection module 140 such that only a single signal is provided for each input to the ARFN 102.

In a particular implementation, the touch aggregator module 142 receives input from both the near surface touch detection module 138 and the surface touch detection module 140 until the touch aggregator module 142 receives input indicating that a touch event has occurred. Thus, both the near surface touch detection module 138 and the surface touch detection module 140 analyze data to determine whether a touch event has occurred until receiving a signal from the touch aggregator module 142 that a touch event has occurred. In this way, a single input provided by the user 108 will not be mistakenly characterized as multiple different touches. For example, as long as the surface touch detection module 140 has not provided a signal to the touch aggregator module 142 that a touch event has occurred, the near surface touch detection module 138 may continue to analyze data to determine whether a touch event has occurred. Once the touch aggregator module 142 has received input from the surface touch detection module 140 that a touch event has occurred, the touch aggregator module 142 will no longer consider the input being received from the near surface touch detection module 138 to avoid providing a duplicate signal regarding the touch event. In some cases, the touch aggregator module 142 may also send a signal to the near surface touch detection module 138 to stop determining whether a touch event has occurred when the touch aggregator module 142 receives input from the surface touch detection module 140 that the touch event has occurred.

The content datastore 134, meanwhile, stores content to be output within the environment 100. For instance, the content datastore 134 may store applications and data for use within the environment 100. The projection module 132 may access the content datastore 134 in order to project requested content within the environment 100. For instance, when a user requests that the ARFN 102 project a particular electronic book, the projection module 132 may access the content datastore 134 to retrieve and cause projection of the desired electronic book.

The computer-readable media 126 may also store the system parameters datastore 136, which is configured to maintain information about the state of the computing device 104, the projector 106, the sensor 110, and so forth. For example, and as described in detail below, the ARFN 102 may be configured to pan and tilt for the purpose of allowing the projector 106 and the sensor 110 to access different projection surfaces in the environment 100. As such, the system parameters maintained in the system parameters datastore 136 may include current pan and tilt settings of the projector 106 and the sensor 110, an indication of content that the ARFN 102 is currently projecting or otherwise outputting, and the like.

The system parameters datastore 136 (or another datastore) may further store a library of reference gestures that may be used to interpret user gestures. As illustrated, the user 108 in the environment 100 may make gestures with his body, such as hand motions, that can be captured by the sensors 110. The computing device 104 may identify motion parameters corresponding to the observed gesture and compare the observed motion parameters to those of the library of reference gestures. The computing device 104 may then classify the observed gesture based on the comparison.

FIG. 2 shows additional details of an example ARFN 102 that may be configured to project a user interface (UI), and to identify and respond to user gestures, as described above with reference to FIG. 1. The ARFN 102 is configured to scan at least a portion of a scene 202 and the objects therein. In a particular implementation, the scene 202 may be at least a portion of the environment 100 of FIG. 1. The ARFN 102 may also be configured to provide output, such as images, sounds, and so forth.

A chassis 204 holds the components of the ARFN 102. One or more projectors 106 may be disposed within the chassis 204 and may be configured to generate and project images into the scene 202. These images may be visible light images perceptible to the user, visible light images imperceptible to the user, images with non-visible light, or a combination thereof. The projector 106 may be implemented with any number of technologies capable of generating an image and projecting that image onto a surface, such as an input surface, within the scene 202. Suitable technologies include a digital micromirror device (DMD), liquid crystal on silicon display (LCOS), liquid crystal display, 3LCD, and so forth. The projector 106 has a projector field of view 206 which describes a particular solid angle. The projector field of view 206 may vary according to changes in the configuration of the projector 106. For example, the projector field of view 206 may narrow upon application of an optical zoom to the projector 106.

Additionally, the projector 106 may project light along a projection axis 208. In one implementation, the projection axis 208 may extend away from a projector lens and be oriented perpendicular to a surface of the lens cover as shown in FIG. 2. In some situations, the projection axis 208 may change as the position of the projector 106 changes. For example, as the projector 106 is tilted upward, the projection axis 208 may also move upward.

One or more cameras 210 may also be disposed within the chassis 204. The camera 210 is configured to image the scene 202 in visible light wavelengths, non-visible light wavelengths, or both. The camera 210 has a camera field of view 212 that describes a particular solid angle. The camera field of view 212 may vary according to changes in the configuration of the camera 210. For example, an optical zoom of the camera 210 may narrow the camera field of view 212.

In some implementations, a plurality of cameras 210 may be used. For instance, one embodiment of the ARFN 102 may include a three-dimensional (3D), infrared (IR) camera and a red-green-blue (RGB) camera. The 3D, IR camera may be configured to capture information for detecting depths of objects within the scene 202, while the RGB camera may be configured as a 2D camera to detect edges of objects by identifying changes in brightness, color, and/or texture within the scene 202. In some instances, a single camera may be configured to perform these functions.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the projector 106 and/or the camera 210. For example, in one implementation the actuator may comprise a pan motor 214, a tilt motor 216, a roll motor 218, and so forth. The pan motor 214 is configured to rotate the chassis 204 in a yawing motion. The tilt motor 216, meanwhile, is configured to change the pitch of the chassis 204. The roll motor 218 is configured to move the chassis 204 in a rolling motion. By panning, tilting, and/or rolling the chassis 204, different views of the scene 202 may be acquired.

One or more microphones 220 may be disposed within the chassis 204, or elsewhere within the scene 202. These microphones 220 may be used to acquire input from a user in the scene 202, may be used to determine the location of a sound, or may be used to otherwise aid in the characterization of and receipt of input from the scene 202. For example, the user may make a particular noise, such as a tap on a wall or a snap of the fingers, which are pre-designated as attention command inputs. The user may alternatively use voice commands. Such audio inputs may be located within the scene 202 using time-of-arrival differences among the microphones 220 and used to summon an active zone within the scene 202.

One or more speakers 222 may also be present to provide for audible output. For example, the speakers 222 may be used to provide output from a text-to-speech module or to playback pre-recorded audio.

A transducer 224 may also reside within the ARFN 102, or elsewhere within the environment, and may be configured to detect and/or generate inaudible signals, such as infrasound or ultrasound. These inaudible signals may be used to provide for signaling between accessory devices and the ARFN 102.

The ARFN 102 may also include a ranging system 226. The ranging system 226 is configured to provide distance information from the ARFN 102 to a scanned object or a set of objects. The ranging system 226 may comprise radar, light detection and ranging (LIDAR), ultrasonic ranging, stereoscopic ranging, and so forth. In some implementations the transducer 224, the microphones 220, the speaker 222, or a combination thereof may be configured to use echolocation or echo-ranging to determine distance and spatial characteristics.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment 100, such as televisions, stereo systems, lights, and the like.

FIG. 2 also illustrates a projector/camera linear offset designated as "O". This is a linear distance between the projector 106 and the camera 208. Placement of the projector 106 and the camera 210 at a distance "O" from one another may aid in the recovery of 3D structured light data from the scene 202. The known projector/camera linear offset "O" may also be used to calculate distances, dimensioning, and otherwise aid in the characterization of objects within the scene 202. In other implementations the relative angle and size of the projector field of view 206 and camera field of view 212 may vary. Also, the angle of the projector 106 and the camera 210 relative to the chassis 204 may vary.

In other implementations, the components of the ARFN 102 may be distributed in one or more locations within the scene 202. As mentioned above, microphones 220 and speakers 222 may be distributed throughout the environment that includes the ARFN 102. The projector 106 and the camera 210 may also be located in separate chassis 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Figure 3:
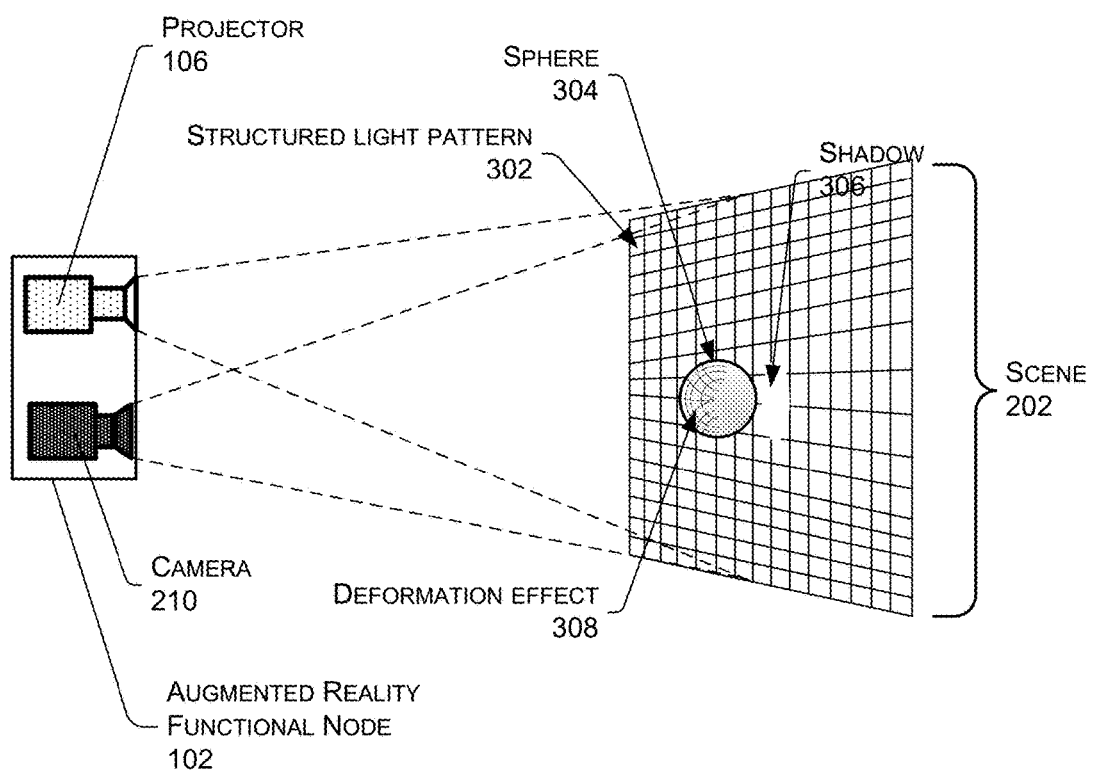
FIG. 3 is an illustrative diagram of the ARFN using structured light to identify surfaces, objects, and user interactions within an environment.

FIG. 3 is an illustrative diagram of the ARFN 102 using structured light to identify 3D information regarding users, user hands, and other objects within an environment. However, while the structured light techniques described herein provide one example for obtaining 3D information regarding these objects, it is to be appreciated that 3D information may be determined in other manners in other embodiments, such as using ToF sensors or other depth-sensing techniques.

In the instant illustration, the projector 106 projects a structured light pattern 302 onto the scene 202. In some implementations a sequence of different structured light patterns 302 may be used. In other implementations, other devices such as general room lighting may generate structured light patterns. A light fixture, bulb, and so forth may be configured such that emitted light contains one or more modulated structured light patterns 302. For example, two structured light patterns may be presented, each at a different non-visible wavelength within the structure of an incandescent bulb.

The cameras 210 used to detect the structured light may also be incorporated into bulbs or assemblies suitable for installation in existing light fixtures. These assemblies may be configured to communicate with the computing device 104 wirelessly or via transmission of a signal via the household electrical wiring. In some implementations, the assembly may provide pre-processing of input prior to sending data along to the computing device 104.

This structured light pattern 302 may be in wavelengths that are visible to a user within the scene 202, non-visible to the user, or a combination thereof. The structured light pattern 302 is shown in this example as a grid for ease of illustration and not as a limitation. In other implementations other patterns, such as bars, dots, pseudorandom noise, and so forth may be used. Pseudorandom Noise (PN) patterns are useful as structured light patterns because a particular point within the PN pattern may be specifically identified. A PN function is deterministic in that given a specific set of variables, a particular output is defined. This deterministic behavior allows for specific identification and placement of a point or block of pixels within the PN pattern. In some implementations, a plurality of structured light patterns 302 may be used to image the scene 202. These may include different PN patterns, geometric shapes, and so forth.

For illustrative purposes in FIG. 3, a sphere 304 is shown positioned between the projector 106 and a wall in the scene 202. A shadow 306 from the sphere 304 appears on the wall. Inspection of the sphere 304 shows a deformation or distortion effect 308 of the structured light pattern 302 as it interacts with the curved surface of the sphere 304.

In some implementations other effects, such as dispersion of the structured light pattern 302, may be used to provide information on the topology of the scene 202. Where the projector 106 and camera 210 have differing fields of view, such as shown in FIG. 2, the dispersion or change in the "density" of the structured light pattern 302 may be used to determine depth of field.

The camera 210 may detect the interaction of the structured light pattern 302 with objects within the scene 202. For example, the deformation effect 308 on the sphere 304 may be detected by the camera 210. The camera 210 may similarly identify deformation effects on users within the scene 202 and may utilize this information to identify user gestures and trajectories of these gestures. That is, the camera 210 may identify, via deformation in the structured light, a location of a selection tool (e.g., a user's finger) as this location changes over time. The ARFN 102 may then use these locations tracked over time to identify a trajectory of the gesture.

Described below are techniques of using a projection and imaging system (e.g., an ARFN 102) to detect an input on or near a surface. The various processes described below with reference to FIGS. 4 and 10 may be implemented by the architectures described herein, or by other architectures. Each process is illustrated as a collection of blocks in a logical flow graph. Some of the blocks represent operations that can be implemented in hardware, software, or a combination thereof. In an illustrative example, the operations may be implemented via one or more of the modules 128, 130, 132, 138, 140 and 142 of the ARFN 102 of FIG. 1. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

Figure 4:
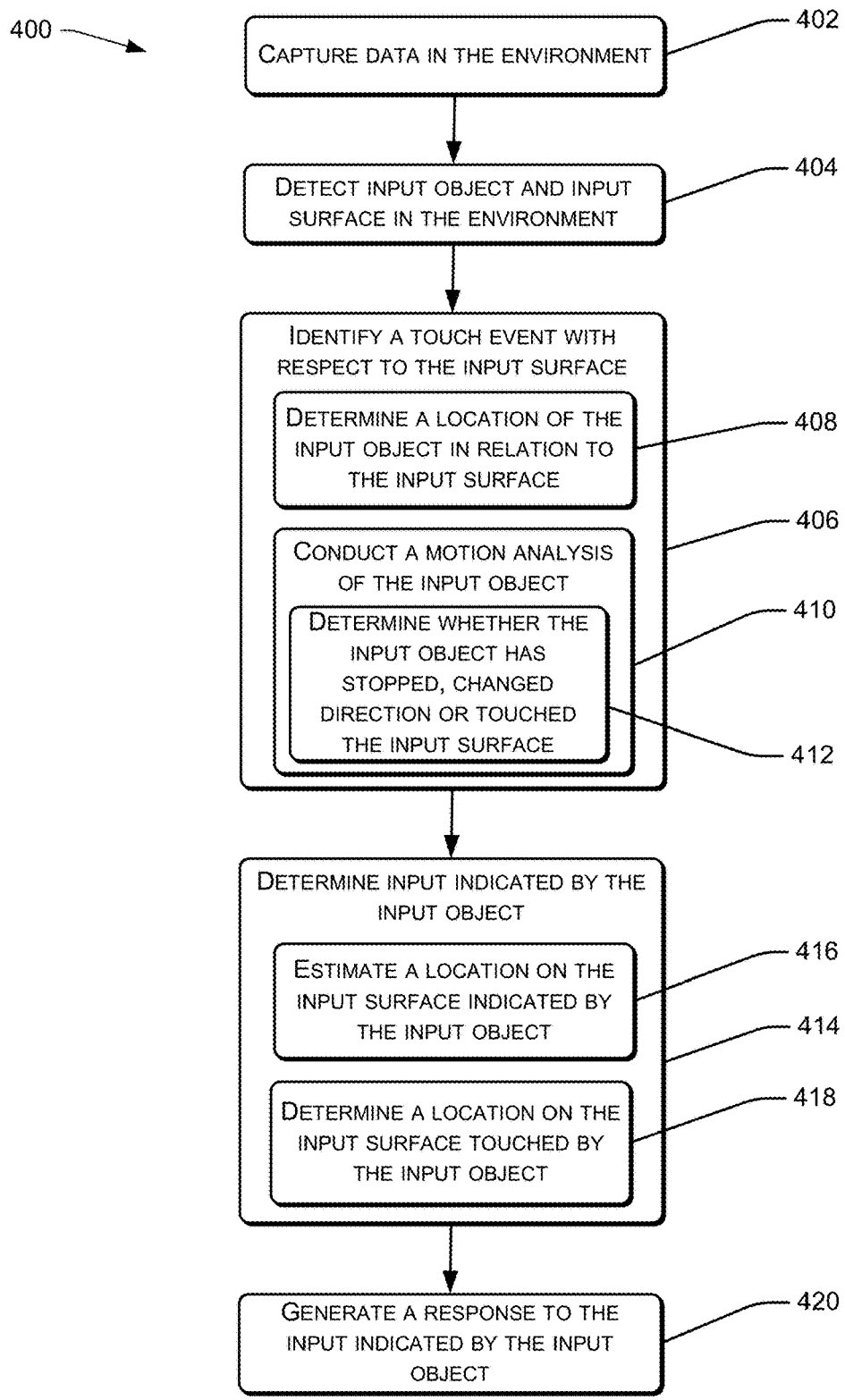
FIG. 4 illustrates an example flow diagram of a process to detect an input on or near a surface.

FIG. 4 illustrates an example flow diagram of a process 400 to detect an input on or near a surface. The process 400 will be described as being performed in the environment 100 described above with reference to FIGS. 1-3. However, the process 400 may be performed in other environments, using other means of image capture and/or scene analysis. This process is illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. Further, not all of the blocks may be executed in each implementation.

At 402, data is captured by one or more of the sensors 110 of the ARFNs 102. For example, a plurality of images of a scene 202 within the environment 100 may be obtained via the cameras 210. In one implementation, at least a portion of the plurality of images may be captured in series over time. Additionally, at least a portion of the plurality of images may be captured at substantially the same time. To illustrate, a 3D camera may capture an image of the environment 100 at substantially the same time that the 2D RGB camera captures an image of the environment 100.

In some cases, the plurality of images may include 2D images of the scene 202. In other cases, the plurality of images may include 3D images of the scene 202. In a particular implementation, depth information indicating a distance between portions of an object and the sensor 110 may be added to data from 2D images to generate 3D images. In one illustrative example, the depth information may be generated by a time-of-flight (ToF) sensor. Additionally, 3D information or characteristics may be obtained by detecting the interaction between the structured light pattern 302 and one or more objects within the scene 202, such as an input object utilized by the user 108 to indicate an input. Alternatively, or in addition, the captured images may include images of the scene 202 taken from different perspectives, which may be analyzed in comparison to each other to reconstruct 3D characteristics of the scene 202. Further, at least a portion of the plurality of images may include images captured by an RGB camera.

At 404, the process 400 may include detecting an input object and an input surface in the environment 100. In one implementation, the input object and the input surface may be identified based on contours of objects in the environment 100. For example, contours of objects in the environment 100 may be generated from data obtained from images of the environment 100. In a particular implementation, contours of objects in the environment 100 may be determined by segmenting surfaces within the environment 100 to identify different continuous surfaces of 3D images of the environment 100. In some instances, the segmentation of the 3D images of the environment 100 may produce 3D data sets corresponding to each respective continuous surface. The continuous surfaces within the environment 100 may be identified by determining distances between particular points in the environment 100 and the sensor 110. When the difference between respective distances between two points within the environment 100 and the sensor 110 is less than or equal to a threshold distance, the two points are designated as being part of the same continuous surface.

Afterwards, 3D boundaries of the continuous surfaces may then be determined. The 3D boundaries of the continuous surfaces may include 3D points located on the outermost edges or the periphery of the continuous surfaces in the environment 100. Subsequently, 2-dimensional (2D) contours of the continuous surfaces may be generated from the 3D boundaries. In some cases, a function may be applied to the contours generated for an image to decrease any noise associated with the contour and to smooth the contours. In an illustrative implementation, a 2D Gaussian kernel may be applied to the contours to perform a smoothing operation.

After generating contours for objects in the environment 100, the contours of the objects may be compared to contours of particular objects included in a catalog of reference objects. In some cases, additional information associated with features of the objects in the environment 100 may be compared to information stored in the catalog of reference objects, such as dimensions of the objects, colors of the objects, shapes of the objects, combinations thereof, and the like. In one implementation, the features of the objects in the environment 100 may be determined using data from RGB images of the environment 100, 2D images of the environment 100, 3D images of the environment 100, or a combination thereof. In one example, a first particular object in the environment 100 may be identified as an input object when the contours and/or additional features of the first particular object match the contours and/or additional features of the input object in the catalog of reference objects. Additionally, a second particular object in the environment 100 may be identified as an input surface when the contours and/or additional features of the second particular object match the contours and/or additional features of the input surface in the catalog of reference objects.

In other implementations, modeling techniques may be utilized to determine whether the contours of the objects in the environment 100 match those of an input object, an input surface, or both. In one example, an input object may at least partially be modeled as an ellipse or rectangle, such as when the input object is a stylus or another pointing device. When the input object is a hand with a pointing finger, the input object may be modeled as a circle corresponding to a palm portion of the hand and as an ellipse corresponding to the pointing finger. Furthermore, the input surface may be modeled as a rectangle or square having specified dimensions.

In some cases, the sizes associated with the features of the models may depend on average or median sizes of the corresponding objects. For example, the radius of a circle used to model a palm portion of a hand may be based on the average or median size of an adult human hand. In another example, a length of a rectangle or a major axis of an ellipse used to model a stylus may be based on the average or median length of styluses available on the market. The techniques used to model the input surface and the input object within the environment 100 are not limited to those described herein. Other suitable techniques may be used to model an input surface and an input object to determine whether the input surface and the input object are included in images of the environment 100.

At 406, the process 400 includes identifying a touch event with respect to the input surface. In some cases, the touch event may occur when the input object has not touched the input surface, but when the input object is in close proximity to a portion of the input surface. In other cases, the touch event may occur when the input object contacts a portion of the input surface.

Identifying a touch event with respect to the input surface may include, at 408, determining a location of the input object in relation to the input surface. In a particular implementation, the process 400 may include analyzing data from one or more images of the environment 100 to determine a location of the input object in the environment 100 and to determine a location of the input surface. In one implementation, the location of the input object may be expressed as the 3D position of the input object and the 3D angular orientation of the input object. Position and angular orientation may be evaluated as absolute positions and orientations or as relative positions and orientations. As an example, 3D position coordinates may be specified relative to orthogonal X, Y, and Z axes. 3D angular orientations may be specified as rotations about the X, Y, and Z axes.

In one implementation, the location of the input object and the location of the input surface may be used to determine a distance between the input object and the input surface. In an illustrative implementation, the distance between the input object and the input surface may be calculated using a first point on the input object and a second point of the input surface. In one example, the first point of the input object used to determine the distance between the input object and the input surface may include a point at the tip of the input object or a point of the input object located a minimum distance from the second point of the input surface. In some cases, the first point on the input object may lie on a plane substantially parallel with the input surface. In an illustrative implementation, the second point of the input surface used to determine the distance between the input object and the input surface may be located perpendicular to the plane and otherwise correspond to the location of the first point. In an illustrative example, the first point may have a location expressed as $(X_1, Y_1, Z_1)$ and the second point may have a location expressed as $(X_1, Y_2, Z_1)$. In some cases, the input object may be moving at an angle toward the input surface, such that the location of the input object changes in both the X-direction and the Y-direction. In these situations, a subsequent location of the input object may be expressed as $(X_2, Y_{1.5}, Z_1)$ and the distance between the input object and the input surface may be calculated with respect to the point $(X_2, Y_2, Z_1)$ on the input surface. Thus, the distance between the input object and the input surface may be calculated with respect to different points on the input surface at different times based, at least in part, on the location of the input object. In other instances, the input object may be moving in a direction substantially perpendicular to the input surface with the subsequent location of the input object being $(X_1, Y_{1.5}, Z_1)$ and the distance between the input object and the input surface being calculated with respect to the point $(X_1, Y_2, Z_1)$ on the input surface. In still additional scenarios, the distance between the input object and the input surface may be determined from a fixed point on the input surface. Accordingly, in some cases, the distance between the input object and the input surface may be calculated from the same point on the input surface.

At 410, the process 400 includes conducting a motion analysis of the input object. In some implementations, the motion analysis may be conducted when the location of the input object is within the boundaries of a threshold region. In some cases, the threshold region may be proximate to the input surface. The threshold region may be bounded by a first plane and a second plane that are substantially parallel to the input surface. For illustrative purposes, the first plane may refer to the plane of the threshold region parallel to the input surface and nearest to an outer surface or exterior face of the input surface. In some cases, the first plane may include the exterior face of the input surface. Additionally, the second plane may refer to the plane of the threshold region parallel to the input surface and farthest from the outer surface of the input surface. In an illustrative example, when the first plane does not include the exterior face of the input surface, the first plane may be located no more than a minimum distance from the input surface, such as 1 mm from the input surface. In another illustrative example, the second plane may be located at least 2 cm from the input surface and no more than 6 cm from the input surface. In one instance, the distance calculated between a point of the input object and a point of the input surface may be used to determine whether the input object is in the threshold region. To illustrate, when the second plane of the threshold region is 3 cm from the input surface and a distance between a point of the input object and a point of the input surface is between less than 3 cm, the input object may be designated as being in the threshold region. In a particular implementation, the input object may move within the threshold region as the user 108 moves the input object toward the input surface to indicate an input.

Conducting the motion analysis of the input object may include, at 412, determining whether the input object has stopped, changed direction, or touched the input surface. In one implementation, the location of the input object may be tracked as the input object moves through the threshold region and toward the input surface. In some cases, the ARFN 102 may determine that the input object is moving toward the input surface when the distance between the input object and the input surface is decreasing over time and that the input object is moving away from the input surface when the distance between the input object and the input surface increases over time.

In a particular implementation, the location of the input object may be tracked by analyzing images captured of the environment 100 and determining differences in the location of the input object in different images. In some cases, as the input object moves toward the input surface, the location of the input object in one or more images of the environment 100 captured at a first time may be compared to the location of the input object in one or more images of the environment 100 captured at a second time. When the distance between the location of the input object in the first set of images and the location of the input object in the second set of images is less than a particular distance, such as less than 0.2 cm, the ARFN 102 may determine the input object may have stopped momentarily to indicate an input and that a touch event has occurred. In some cases, the ARFN 102 may determine whether the distance between the location of the input object in three or more sets of images (e.g. the location of the input object in sets of images captured at three or more successive times) is less than a particular distance before determining that the input object has stopped momentarily to indicate an input and that a touch event has occurred.

In one implementation, the distance between a location of the input object in one or more images captured at a first time and a location of the input object in one or more images captured at a second time may be used to calculate the speed of the input object in conjunction with the difference between the first time and the second time. In an illustrative implementation, the difference between the first time and the second time may be within a range of 0.02 seconds to 0.5 seconds. In some cases, the speed of the input object may also be used to determine whether a touch event has occurred. To illustrate, when the speed of the input object is less than a threshold speed or within a specified range of speeds, the ARFN 102 may determine that the input object has stopped momentarily and that a touch event has occurred.

Additionally, at 412, the process 400 may determine whether the input object has changed direction based on the location of the input object at a plurality of times. In one implementation, the ARFN 102 may determine whether the input object has changed direction by determining the distance between the input object and the input surface in a number of images captured at different times. When the distance between the input object and the input surface is decreasing in a first set of images and then increasing in a second set of images captured subsequent to the first set of images, the ARFN 102 may determine that the input object has changed direction. In some cases, the ARFN 102 may determine that an input has been indicated by the input object based on a change in direction of the input object from moving towards the input surface to moving away from the input surface. In other cases, the ARFN 102 may utilize both the change in distance between the input object at multiple times and a change in direction of the input object to determine whether a touch event has occurred.

After determining that a touch event has occurred, the process 400, at 414 may determine an input indicated by the input object. For example, at 416, the process 400 includes estimating a location on the input surface indicated by the input object. In one implementation, the ARFN 102 may identify a shadow of the input object cast onto the input surface and determine a location on the input surface indicated by the input object using the shadow. In particular, RGB images of the input surface captured at or near the time of the touch event may be used to identify a shadow of the input object. To illustrate, the ARFN 102 may identify a shadow of the input object on the input surface based on contrasts in texture and/or color across the input surface. In one implementation, after identifying a shadow of the input object cast on the input surface, the ARFN 102 may determine a location on the input surface indicated by the input object by identifying pointing portion (i.e., a tip) of the shadow or some other outermost boundary of the shadow. The tip of the shadow may be identified by contrasts in texture and/or color between the boundaries of the shadow and the input surface.

In other implementations, the location of the input surface indicated by the input object may be determined by extrapolating the location of the input object when a touch event occurs to a location on the input surface. In some cases, the location of the input object may be extrapolated along the projection axis 208. In a particular example, the location of the input object may be extrapolated along the projection axis 208 based at least partly on the location of the projector 106, such as when the projector 106 is located behind the user 108.

In other situations, the location of the input object may be extrapolated based at least partly on a direction that the user 108 is facing, a direction that the input object is pointing, or both. In an embodiment, the direction that the user 108 is facing may be determined utilizing techniques that can recognize the features of the face of the user 108.

In another implementation, the direction that the input object is pointing may be determined based at least partly on the shape of the object. For example, when the input object is larger at one end and is elongated toward a smaller tip at the other end, the user 108 may use the tip of the input object to indicate an input on the input surface. In these cases, the contours of the input object may be used to determine the direction that the input object is pointing by creating an axis along the input object from the larger portion of the input object to the tip and then extrapolating the location of the tip of the input object to the input surface based at least partly on this axis.

Further, the direction that the input object is pointing may also be determined based at least partly on a direction that the arm of the user 108 is pointing. In these cases, contours of the body of the user 108 may be utilized to identify the arm of the user 108 and an axis may be generated along at least a portion of the length of the arm. For example, the axis may run from the elbow of the user 108 to the hand of the user 108. In these situations, the user 108 may be pointing the input object along the axis of the arm and the location on the input surface that the input object is indicating may be extrapolated from the location of the input object to the input surface.

In other implementations, a location on the input surface being indicated by the input object with respect to a touch event may be estimated based, at least in part, on a shortest distance between input features on the input surface and the input object. For example, the input surface may include a number of input features that are each selectable to indicate a particular input, such as numbers of a telephone keypad. The respective distance between each of the input features and the input object may be calculated and the input feature having the shortest distance from the input object may be designated as the input feature being indicated by the input object during a touch event.

In a particular implementation, information obtained from a number of techniques may be utilized to estimate the location indicated by the input object. In various implementations, a respective weighting may be assigned to the information generated by implementing each technique. For example, a first weighting may be associated with a first technique to estimate the location of the input surface indicated by an input object, such as using the shadow of the input object, and a second weighting may be associated with a second technique to estimate the location of the input surface indicated by the input object, such as extrapolating the location of the input object along a particular axis to a location on the input surface. In some cases, a third weighting may be assigned to a location on the input surface determined by identifying the input feature that is the closest to the input object when a touch event occurs. The weighting associated with each technique may be dynamic based on one or more factors, such as a distance between the input object and the input surface, a speed of the input object, or both. To illustrate, when a distance between the input object and input surface is greater than a threshold distance and/or the speed of the input object is greater than a particular speed, the location of the input surface estimated using an extrapolation technique may be weighted more heavily than the location of the input surface estimated based on a location of the shadow of the input object. Additionally, as the distance between the input object and the input surface decreases and/or the speed of the input object decreases, the location of the input surface estimated based on the location of the shadow of the input object may be weighted more heavily than the location of the input surface estimated using an extrapolation technique.

In some scenarios, the input object may touch the input surface. In these cases, the process 400, at 418, may determine the portion of the input surface that was touched by the input object. For example, when the input surface includes a touch sensitive device, the touch sensitive device may provide a signal indicating the particular portion of the input surface that was touched by the input object.

At 420, the process 400 includes generating a response to the input indicated by the input object. For example, the ARFN 102 may determine that the portion of the input surface indicated by the input object may correspond to a particular feature of a user interface shown on the input surface. To illustrate, the location of the input surface indicated by the input object may correspond to a particular icon included in the user interface. In some cases, the icon may be associated with a particular application, while in other cases, the icon may be associated with particular content, such as a particular song, movie, television show, or other form of media. In still other situations, the input object may be interacting with other items shown on the user interface, such as words of a text document or images associated with a game. Accordingly, the input provided by the user 108 via the input object and the input surface may cause an application to open, selected content to play, or particular text to be highlighted.

Although, the process 400 has been described with respect to an input being provided in conjunction with a pointing motion, the process 400 can also be applied to other motions used to indicate an input. For example, the process 400 can be used to detect a dragging input. In particular, the ARFN 102 can monitor the motion of the input object after the pointing input has been made and determine if the input object moves along a plane that is parallel to the input surface as opposed to moving away from the input surface. The detection of a dragging input will be described in more detail with respect to FIG. 7. Additionally, the process 400 may be utilized to detect gestures made near the input surface to identify inputs being indicated by the gestures. In one example, the user 108 may move the input object in a circle near the surface of the input surface to indicate an input to select a particular portion of a user interface being shown on the input surface. In this example, the circular gesture may be detected with gesture recognition techniques that utilize contours of the input object and the location of the input object determined over time from a number of images of the environment 100 that are captured in sequence.

Figure 5:
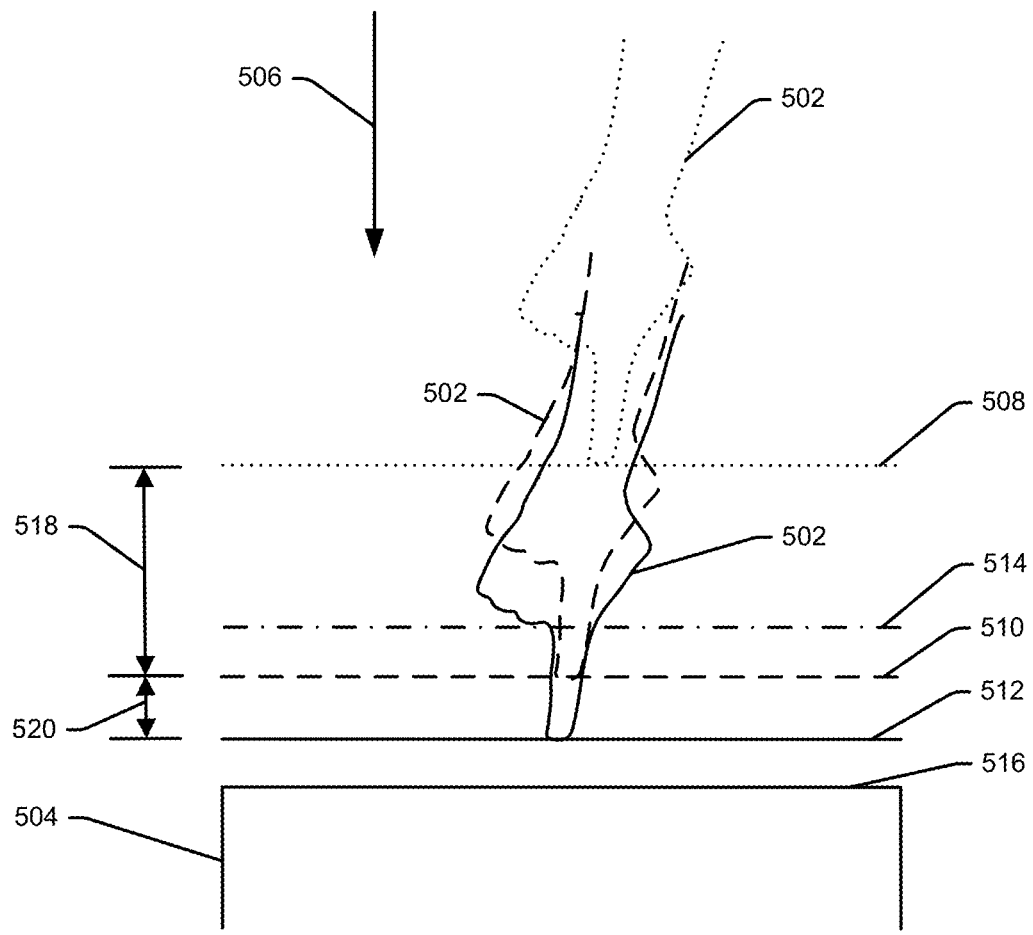
FIG. 5 illustrates a diagram of the motion of a hand being used to provide an input near a surface.

FIG. 5 illustrates a diagram of the motion of a hand 502 being used to provide a touch input near a surface 504 according to one implementation. In this example, the hand 502 is an input object and is moving in a direction 506 toward the surface 504 to provide an input. The illustrative implementation of FIG. 5 shows the movement of the hand toward the surface 504 through a first location 508 of the hand 502, a second location 510 of the hand 502, and a third location 512 of the hand 502. The first location 508 may represent the location of the hand 502 at a first time, the second location 510 may represent the location of the hand 502 at a second time, and the third location 512 may represent the location of the hand 502 at a third time. Further, the illustrative implementation of FIG. 5 includes a first boundary 514 of a threshold region. A second boundary 516 of the threshold region may include an exterior face of the surface 504. In some cases, the distance between the first boundary 514 and the second boundary 516 may specify a threshold distance.

As the hand 502 moves past the first boundary 514 and into the threshold region, a system, such as the ARFN 102 may determine whether a touch event has occurred. For example, the ARFN 102 may determine a first distance 518 between the first location 508 of the hand 502 and a second location 510 of the hand 502. Additionally, the ARFN 102 may determine a second distance 520 between the second location 510 and the third location 512. In some cases, the distances 518, 520 can be used to calculate a speed of the hand 502. In one implementation, the ARFN 102 may utilize the speed of the hand 502 and/or the distances 518, 520 to determine whether a touch event has occurred with respect to the hand 502, as described previously. Although not shown in FIG. 5, if the hand 502 progresses through the first boundary 514 of the threshold region and the hand 502 touches the surface 504, the ARFN 102 may determine that a touch event has occurred.

In an implementation, a location of the first boundary 514 of the threshold region may change based on one or more factors. For example, the location of the first boundary 514 of the threshold region may change based, at least in part, on the speed of the hand 502. To illustrate, when the speed of the hand 502 is above a specified speed, the distance between the location of the first boundary 514 and the second boundary 516 may be greater than when the speed of the hand 502 is less than the specified speed.

Figure 6:
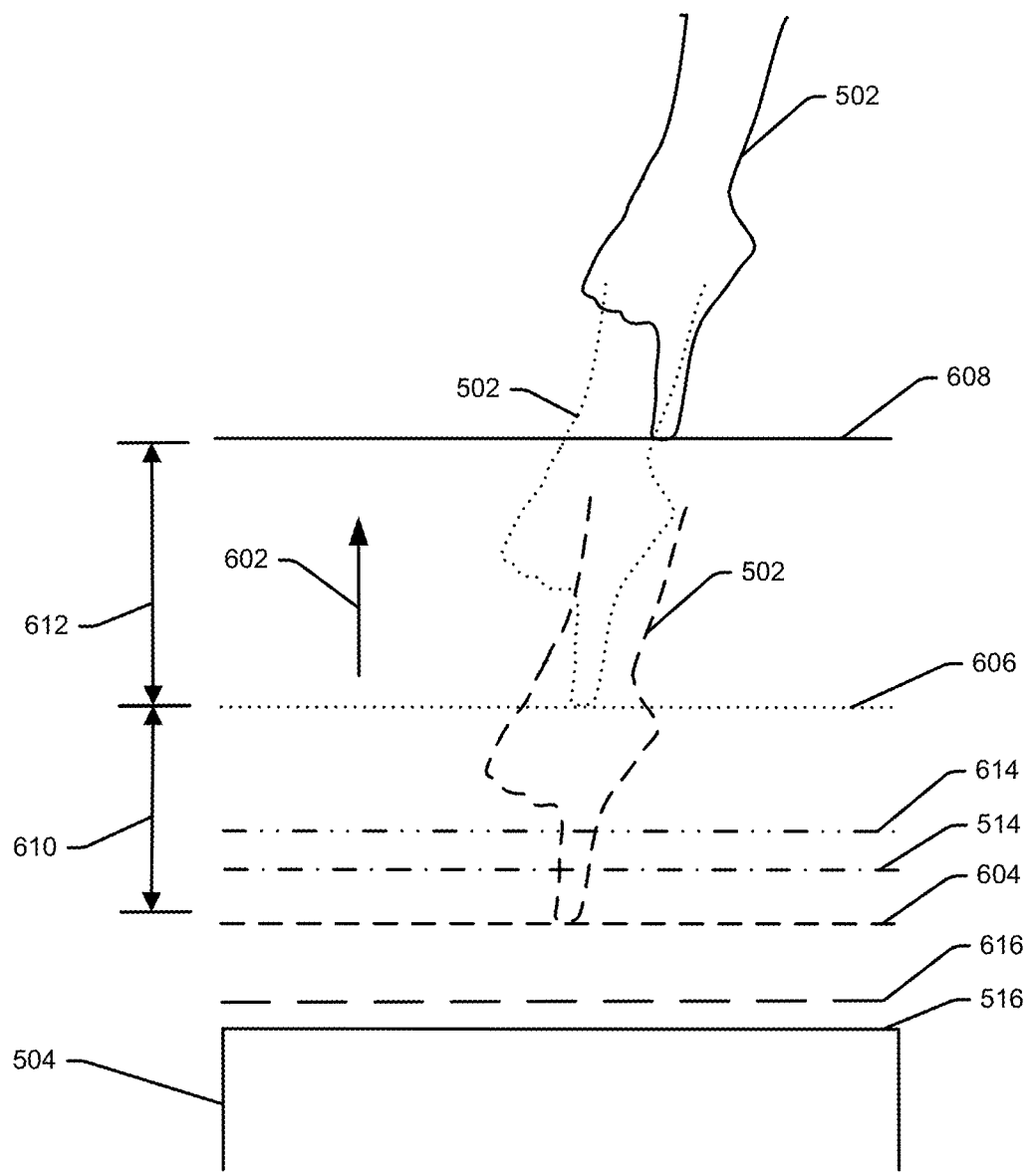
FIG. 6 illustrates a diagram of the motion of a hand after providing an input near a surface.

FIG. 6 illustrates a diagram of the motion of a hand 502 after providing a touch input near a surface 504 according to an implementation. In this illustrated scenario, the hand 502 is an input object and is moving in a direction 602 away from the surface 504. That is, the hand 502 is moving in a direction 602 that is generally opposite to the direction 504 of the hand 502 in FIG. 5. The change in direction of the hand 502 from the direction 504 to the direction 602 may be utilized to determine that a touch event has occurred and that the hand 502 has provided an input.

The illustrative implementation of FIG. 6 shows the hand moving away from the surface 504 through a first location 604 of the hand 502, a second location 606 of the hand 502, and a third location 608 of the hand 502. In one implementation, the first location 604 may represent the location of the hand 502 at a first time, the second location 606 may represent the location of the hand 502 at a second time, and the third location 608 may represent the location of the hand 502 at a third time. The illustrative implementation of FIG. 6 also includes the first boundary 514 of a threshold region and the 'second boundary 516 of the threshold region. In some cases, the ARFN 102 may determine a first distance 610 between the first location 604 of the hand 502 and a second location 606 of the hand 502. Additionally, the ARFN 102 may determine a second distance 612 between the second location 606 and the third location 608. In some cases, the distances 610, 612 can be used to calculate a speed of the hand 502. Further, the illustrative implementation of FIG. 6 may include a release boundary 614 that indicates a threshold beyond which the ARFN 102 no longer attempts to determine whether a touch event has occurred. In some cases, the release boundary 614 may be further from the surface 504 than the first boundary 514 of the threshold region, while in other situations, the release boundary 614 may be closer to the surface than the first boundary 514 of the threshold region. In an implementation, a location of the release boundary 614 may be determined by adding a specified distance, such as 5 mm, to a location where the ARFN 102 determines that a touch event has occurred, such as location 616.

Figure 7:
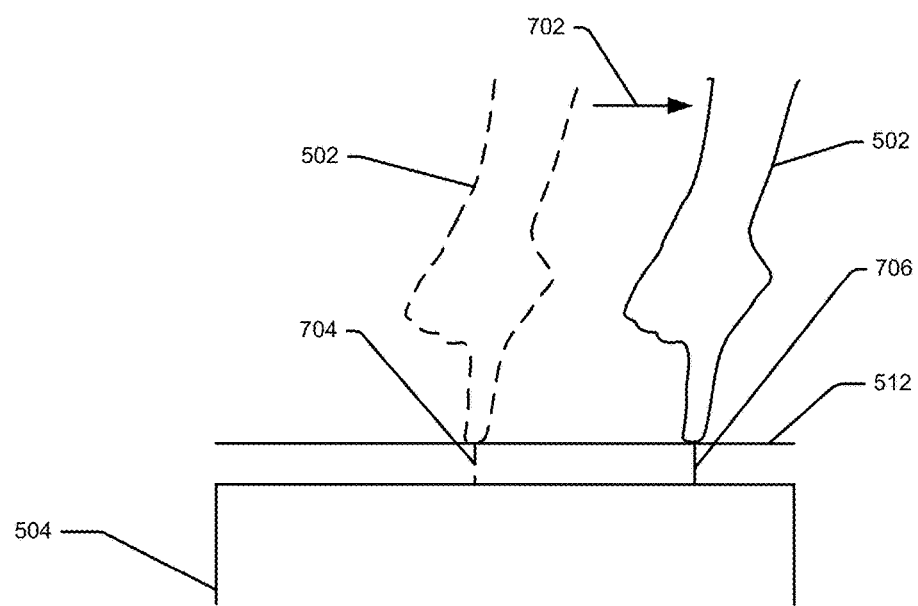
FIG. 7 illustrates a diagram of the motion of a hand providing a drag input near a surface.

FIG. 7 illustrates a diagram of the motion of a hand 502 providing a dragging input near a surface 504 according to one implementation. In particular, the hand 502 may be moving in a direction 702 that is substantially parallel to the surface 504. In the illustrative implementation of FIG. 7, the hand 502 may be located at different points along the line 512 at different times. For example, at a first time, the hand 502 may be located at the first location 704 along the line and at a second time, the hand 502 may be located at the second location 706. In a particular implementation, the hand 502 may move in a direction 506 that is substantially perpendicular to the surface 504 according to the motion shown in FIG. 5 until a touch event occurs and then move in the direction 702 that is substantially parallel to the surface 504 to provide a dragging input to the ARFN 102. In various implementations, the hand 502 may be located within a threshold region while providing the dragging input.

Although the locations of the hand 502 and the boundaries of the threshold region of FIGS. 5-7 are illustrated in two dimensions, in some cases, the locations of the hand 502 and the boundaries of the threshold region of FIGS. 5-7 may also be expressed as three-dimensional features, such as planes or points in a 3-coordinate system. Furthermore, although the surface 504 is situated along a horizontal plane in the illustrative examples of FIGS. 5-7, in other implementations, the surface 504 may be situated along a vertical plane or at a particular angle with respect to a vertical plane or a horizontal plane.

Figure 8:
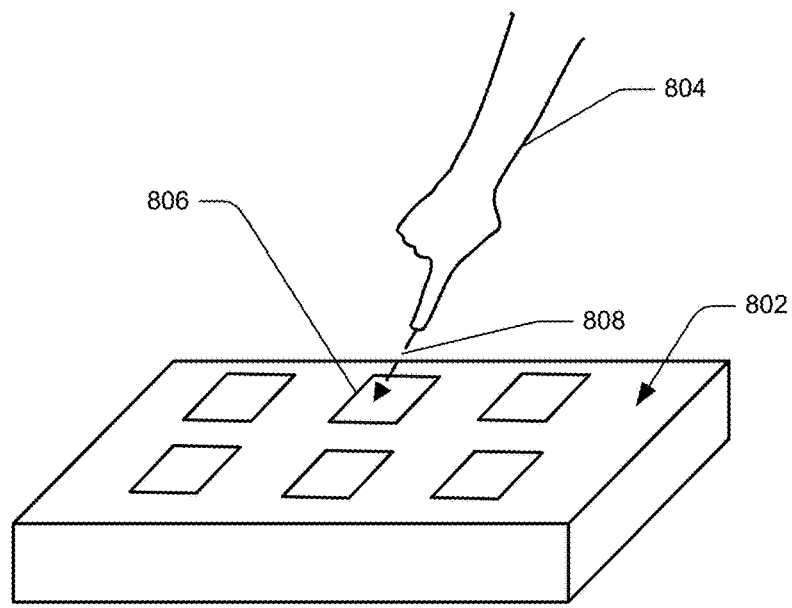
FIG. 8 illustrates an estimation of a portion of an input surface indicated by a hand.

FIG. 8 illustrates an estimation of a portion of an input surface 802 being indicated or selected by a hand 804 according to one implementation. In this illustration, the input surface 802 may include a number of input features, such as input feature 806 that is being indicated by the hand 804. In a particular embodiment, the ARFN 102 may determine that the hand 804 is indicating the input feature 806 by extrapolating the location of the hand 804 to the input surface, such as by estimating a line 808 from the tip of the index finger of the hand 804 to the input surface 802. In some cases, the line 808 may be formed along an axis of a projector providing light and/or images onto the input surface 802. In other situations, the line 808 may be formed along a direction that the user associated with the hand 502 is facing or along a direction that the hand 502 is pointing.

Figure 9:
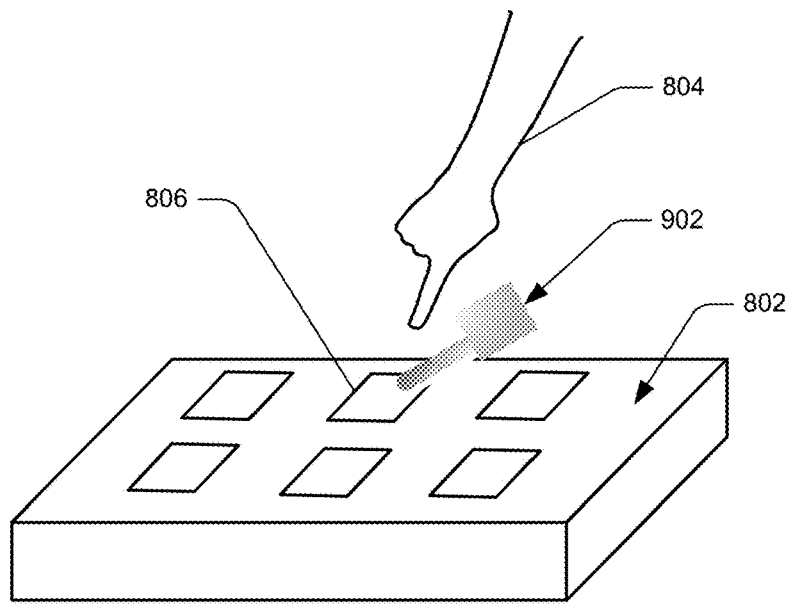
FIG. 9 illustrates an estimation of a portion of an input surface indicated by a hand.

FIG. 9 illustrates an estimation of a portion of an input surface 802 being indicated or selected by a hand 804 according to another implementation. In the illustrative implementation of FIG. 9, the input surface 802 may include a number of input features, such as input feature 806 that is being indicated by the hand 804. In a particular embodiment, the ARFN 102 may determine that the hand 804 is indicating the input feature 806 by identifying a shadow 902 cast onto the input surface 802 by the hand 804. In some cases, the ARFN 102 may determine the portion of the surface 802 that is being indicated by the hand 804 based, at least in part, on the portion of the shadow that corresponds to the tip of the pointing finger of the hand 804. The shadow 902 may be identified by analyzing contrasts in color and/or texture between the input surface 804 and the shadow 902 in images including the input surface 802, the hand 804, and the input feature 806.

Figure 10:
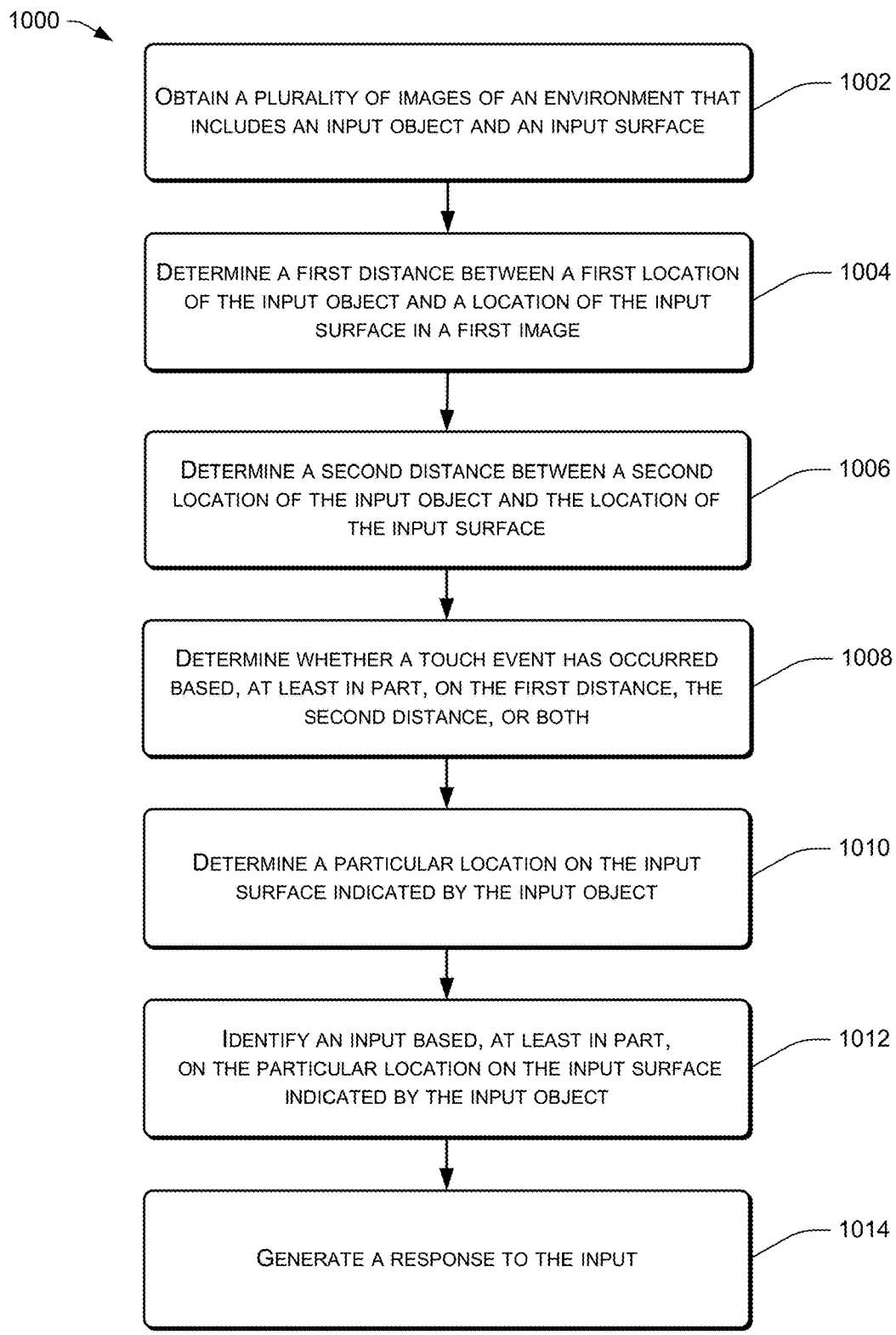
FIG. 10 shows an example flow diagram of a process to detect an input provided by an input object near an input surface.

FIG. 10 shows an example flow diagram of a process 1000 to detect an input provided by an input object near an input surface according to one implementation. At 1002, the process 1000 includes obtaining a plurality of images of an environment. In some cases, the images of the plurality of images may be captured at a rate of at least 30 frames per second. The environment may include an input object, such as a hand, a finger, a stylus, or a combination thereof. The environment may also include an input surface that may be used to indicate input. In a particular implementation, the input surface may display a user interface.

At 1004, the process 1000 includes determining a first distance between a first location of the input object and a location of the input surface. In some cases, the first distance may be determined from one or more images captured at a first time. Additionally, at 1006, the process 1000 includes determining a second distance between a second location of the input object and the location of the input surface. The second location of the input object may be determined using information of one or more images captured at a second time that is subsequent to the first time.

Further, at 1008, the process 1000 includes determining whether a touch event has occurred based, at least in part, on the first distance, the second distance, or both. In a particular implementation, a touch event may be detected when the input object is within a threshold region proximate to the input surface. The threshold region may have a first boundary and a second boundary, where the first and second boundaries are removed from the input surface with the first boundary being closer to the input surface than the second boundary. In another implementation, a boundary of the threshold region may be an external face of the input surface.

In some situations, determining whether the touch event has occurred may include determining whether a difference between the first distance and the second distance is less than a specified distance. In other cases, the speed of the input object may be determined using the first distance, the second distance, and the amount of time elapsed between the first time and the second time. In these instances, determining whether the touch event has occurred may include determining that a speed of the input object is less than a threshold speed or that the speed of the input object is within a specified range of speeds. In other embodiment, determining that the touch event has occurred may include determining that the input object has contacted the input surface.

At 1010, the process 1000 includes determining a location on the input surface indicated by the input object. In some cases, the input surface may be utilized to display a number of input features, such as buttons, icons, and hyperlinks. In other cases, the input surface may be utilized to display content, such as text, images, video, combinations thereof, and the like. In particular implementations, the location on the input surface indicated by the input object may be determined by analyzing the location of a shadow cast by the input object on the input surface. In other implementations, the location on the input surface indicated by the input object may be determined by extrapolating the location of the input object to a particular location on the input surface.

At 1012, the process 1000 includes identifying an input based, at least in part, on the location on the input surface indicated by the input object. For example, the location on the input surface indicated by the input object may include a particular input feature or a particular portion of content being displayed via the input surface. In addition, at 1014, the process 1000 includes generating a response to the input. To illustrate, when a particular icon is indicated by the input object, an action may be performed with respect to selecting the icon, such as opening a document or causing particular content to be displayed via the input surface. The response to the input may also include modifying content of a user interface displayed with respect to the input surface, such as highlighting, copying, or pasting text shown in the user interface.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors;
   one or more cameras to obtain a plurality of images of an environment, the one or more cameras including a 2-dimensional (2D) camera, a 3-dimensional (3D) camera, or both, and the environment including a finger and an input surface, wherein a user interface is displayed via at least a portion of the input surface;
   one or more projectors to project an image onto the input surface in the environment, at least one of the one or more cameras is separated from at least one of the one or more projectors by a linear offset; and
   one or more computer-readable media storing computer-executable instructions that, when executed by the one or more processors, cause the one or more processors to perform acts comprising:
   determining a first location of the finger in the environment based, at least in part, on first information associated with a first image of the plurality of images;
   determining a first distance between the first location and a portion of an exterior face of the input surface;
   determining a second location of the finger in the environment based, at least in part, on second information associated with a second image of the plurality of images, the second image being obtained subsequent to the first image;
   determining a second distance between the second location and the portion of the exterior face;
   determining that the first distance and the second distance are less than a first threshold distance;
   determining that the second distance is less than the first distance;
   determining that a touch event has occurred based, at least in part, on:
   the first distance and the second distance being less than the first threshold distance,
   the second distance being less than the first distance,
   a difference between the first distance and the second distance being less than a second threshold distance, wherein the difference is associated with movement from the first location to the second location; and
   a speed associated with the movement estimated based, at least in part, on the difference and an amount of time between obtaining the first image and the second image;
   determining a location on the input surface associated with the touch event based at least in part on the linear offset; and
   identifying an input based, at least in part, on the location associated with the touch event.

2. The system of claim 1, wherein determining that the touch event has occurred is further based on the speed being less than a threshold speed.

3. The system of claim 1, wherein the acts further comprise:
   determining that the finger contacts the input surface; and
   determining that a surface touch event has occurred based at least in part on the finger contacting the input surface.

4. The system of claim 1, wherein the acts further comprise detecting a shadow on the input surface, and wherein determining the location on the input surface indicated by the finger is based at least in part on detecting the shadow.

5. A method comprising:
   obtaining a plurality of images of an environment;
   identifying an input object and an input surface in the environment;
   determining a first distance between a first location of the input object and a location of the input surface in the environment based, at least in part, on information associated with a first image of the plurality of images;
   determining a second distance between a second location of the input object and the location of the input surface in the environment based, at least in part, on information associated with a second image of the plurality of images, the second image being captured subsequent to the first image;
   determining that the first distance and the second distance are no greater than a threshold distance from the input surface;
   determining that a difference between the first distance and the second distance is less than a specified distance that is no greater than the threshold distance, wherein the difference represents movement of the input object from the first location to the second location;
   determining a speed associated with the input object moving from the first location to the second location, wherein determining the speed is based at least in part on the plurality of images;
   determining that the input object has stopped based on the speed being below a threshold speed; and
   determining that a near surface touch event has occurred based, at least in part on, the difference between the first distance and the second distance being less than the specified distance and the determining that the input object has stopped.

6. The method of claim 5, wherein the input object includes a finger, a hand, a stylus, a pointing device, or a combination thereof.

7. The method of claim 5, wherein the plurality of images are captured via a 2-dimensional (2D) camera, a 3-dimensional (3D) camera, a red-green-blue (RGB) camera, or a combination thereof.

8. The method of claim 5, wherein a first portion of the plurality of images is obtained substantially at a first time and a second portion of the plurality of images is obtained substantially at a second time.

9. The method of claim 5, further comprising generating a response to the near surface touch event, wherein the response includes modifying content of a user interface displayed with respect to the input surface, displaying particular content via the input surface, or both.

10. The method of claim 5, wherein the input surface is touch sensitive.

11. The method of claim 5, wherein the input surface is included in an electronic device.

12. The method of claim 5, further comprising detecting a dragging input based at least in part on a first direction of motion of the input object being substantially perpendicular to the input surface and a second direction of motion of the input object being substantially parallel to the input surface.

13. One or more computer-readable media storing computer-executable instructions that, when executed by one or more processors, cause the one or more processors to perform acts comprising:
   obtaining a series of images of an environment, the series of images including an input object and an input surface in the environment;
   causing a projector to project light onto the input surface;
   determining a distance between a location of the input object and an exterior face of the input surface based at least in part on the series of images;
   determining a speed of the input object moving towards the input surface based at least in part on a first location of the input object and a second location of the input object shown in the series of images; and
   estimating a location on the input surface indicated by the input object based at least partly on determining that the distance is no greater than a threshold distance and that the speed is no greater than a threshold speed, wherein the threshold distance is determined at least in part based on the speed.

14. The one or more computer-readable media of claim 13, wherein the acts further comprise:
   estimating the location on the input surface indicated by the input object using a plurality of techniques, wherein a respective weighting is assigned to a technique of the plurality of techniques.

15. The one or more computer-readable media of claim 14, wherein the respective weighting assigned to the technique is based at least in part on the distance, the speed, or both.

16. The one or more computer-readable media of claim 13, wherein the estimating the location of the input surface indicated by the input object includes:
   identifying a shadow formed on the input surface by the input object and the light projected into the environment; and
   identifying a portion of the shadow corresponding to a pointing portion of the input object; and
   wherein the estimating the location includes determining a particular location on the input surface that includes the portion of the shadow corresponding to the pointing portion of the input object.

17. The one or more computer-readable media of claim 16, wherein the shadow is identified based, at least in part, on a contrast in brightness, color, texture, or a combination thereof, of a first portion of the input surface and a second portion of the input surface.

18. The one or more computer-readable media of claim 13, wherein the estimating the location includes extrapolating the location along a particular direction.

19. The one or more computer-readable media of claim 18, wherein the particular direction includes a direction that the input object is pointing, a direction that a user holding the input object is facing, or a direction of a projection axis of the projector.

20. The one or more computer-readable media of claim 13, wherein the projector projects a user interface onto the input surface and the location corresponds to a particular input feature of the user interface.

21. A system comprising:
   one or more processors;
   one or more cameras to obtain a plurality of images of an environment, the plurality of images captured in series over time and the environment including an input object and an input surface; and one or more computer-readable media storing computer-executable instructions that, when executed by the one or more processors, cause the one or more processors to perform acts comprising:
  determining a location of the input object and a location of the input surface based, at least in part, on analysis of one or more of the plurality of images;
  determining that a near surface touch event has occurred based at least in part on a distance between the input object and the input surface being less than a specified distance based, at least in part, on a particular location of the input object and a particular location of the input surface in an image of the plurality of images;
  determining that the near surface touch event has occurred based, at least in part, on a respective location of the input object in the plurality of images with respect to a threshold region and a direction of motion of the input object in the plurality of images, the direction of motion determined based, at least in part, on a change in position of the input object in individual ones of the plurality of images with respect to an order of the series and changes in time;
  estimating a location on the input surface indicated by the input object based at least in part on determining that the distance between the location of the input object and an exterior face of the input surface is no greater than a threshold distance; and
  providing a second indication indicating that the near surface touch event has ended based at least in part on determining that the input object is outside of the threshold region or determining that a surface touch event occurs.

22. The system of claim 21, wherein the acts further comprise determining a direction of motion of the input object based, at least in part, on a first location of the input object in the environment based, at least in part, on information associated with a first image of the plurality of images captured at a first time and a second location of the input object in the environment based, at least in part, on information associated with a second image of the plurality of images captured at a second time, the second time being subsequent to the first time.

23. The system of claim 22, wherein the direction of motion of the input object is towards the input surface when the first location of the input object is farther away from the location of the input surface than the second location of the input object.

24. The system of claim 23, wherein the determining that the near surface touch event occurs is based at least in part on the direction of motion of the input object being towards the input surface.

25. The system of claim 22, wherein the direction of motion of the input object is away from the input surface based at least in part on the first location of the input object being closer to the location of the input surface than the second location of the input object.

26. The system of claim 22, wherein the determining that the near surface touch event has occurred includes identifying a change in the direction of motion of the input object.

27. The system of claim 22, wherein a dragging input is detected based at least in part on:
  determining a first direction of motion of the input object being substantially perpendicular to the input surface;
  determining that the near touch event has occurred; and
  determining a second of motion of the input object being substantially parallel to the input surface.

28. The system of claim 21, wherein the acts further comprise determining a speed of the input object based at least in part on a difference between a first location of the input object in a first image of the plurality of images and a second location of the input object in a second image of the plurality of images and an amount of time between obtaining the first image and the second image of the plurality of images.

29. The system of claim 28, wherein determining that the near surface touch event has occurred is further based at least in part on the speed of the input object being less than a threshold speed.

* * * * *